(12) United States Patent
Ozawa

(10) Patent No.: US 7,899,505 B2
(45) Date of Patent: Mar. 1, 2011

(54) PORTABLE TERMINAL

(75) Inventor: Jirou Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 727 days.

(21) Appl. No.: 11/816,496

(22) PCT Filed: Feb. 14, 2006

(86) PCT No.: PCT/JP2006/302512
§ 371 (c)(1),
(2), (4) Date: Aug. 16, 2007

(87) PCT Pub. No.: WO2006/088013
PCT Pub. Date: Aug. 24, 2006

(65) Prior Publication Data
US 2009/0054114 A1 Feb. 26, 2009

(30) Foreign Application Priority Data
Feb. 16, 2005 (JP) .................. 2005-039737

(51) Int. Cl.
H04M 1/00 (2006.01)
(52) U.S. Cl. ................ 455/575.4; 455/575.3; 455/556.1; 361/679.02
(58) Field of Classification Search ............... 455/575.4, 455/575.3, 575.1, 556.1; 361/683, 679.02
See application file for complete search history.

(56) References Cited

U.S. PATENT DOCUMENTS 5,657,370 A 8/1997 Tsugane et al.
2002/0071550 A1 6/2002 Pletikosa
2004/0049884 A1* 3/2004 Kim .................. 16/337
2005/0041381 A1* 2/2005 Maskatia et al. ............ 361/683
2005/0113154 A1* 5/2005 Park et al. .................. 455/575.4

FOREIGN PATENT DOCUMENTS

| EP | 1 499 093 A1 | 1/2005 |
|----|----|----|
| JP | 04-085895 A | 3/1992 |
| JP | 07-312631 | 11/1995 |
| JP | 11-027353 | 1/1999 |
| JP | 2004-187185 | 7/2004 |
| JP | 2004-229049 | 8/2004 |
| JP | 2005-510918 A | 4/2005 |
| JP | 2005-191875 A | 7/2005 |
| JP | 2006-005564 | 1/2006 |
| WO | WO-00/27041 A1 | 5/2000 |
| WO | WO-01/16677 A1 | 3/2001 |
| WO | WO-03/046705 A2 | 6/2003 |

* cited by examiner

Primary Examiner — Danh C Le
(74) Attorney, Agent, or Firm — Dickstein Shapiro LLP

(57) ABSTRACT

A portable telephone (1) comprises a first structure (2) including a display portion (2a) such as a liquid crystal screen and a second structure (3) including an operation portion (3a). A projection (4) to engage with a guide groove (5) formed in the side surface of the first structure (2) is formed on the side surface of the second structure (3). Thus, by sliding the second structure (3) to one end side of guide groove (5), pivoting the second structure (3) at the end to the rear surface of the first structure (2), and sliding the second structure (3) to the other end side of the guide groove (5), the second structure (3) is set, from a closed state in which the major surface of the first structure (2) opposes the major surface of the second structure (3), to an open state in which the display portion (2a) and operation portion (3a) are exposed to the outside. In this manner, in the closed state, the second structure (3) covers the display portion (2a) of the first structure (2). This prevents the display portion 2a from causing inconveniences, thereby enhancing the durability.

10 Claims, 7 Drawing Sheets

PORTABLE TERMINAL

TECHNICAL FIELD

The present invention relates to a portable terminal such as a portable telephone and, more particularly, to an opening/closing structure for a portable terminal which comprises two structures.

BACKGROUND ART

In recent years, although various types of portable telephones having various functions are provided, their parts are often immature partly. In particular, concerning an opening/closing structure for a portable telephone, although currently most popular folding structures (see FIG. 8A) had very original shapes when they were first introduced, they are currently similar and may be rather banal. In view of this, the manufacturers are searching for a surprising opening/closing structure that differentiates their portable telephones from those of their competitors. For example, a slide structure as shown in FIG. 8B and a T-shape hinge structure as shown in FIG. 8C have been proposed.

As the slide structure, for example, Japanese Patent Laid-Open No. 2004-229049 discloses a portable terminal comprising an upper housing 101 and lower housing 102 that are slidable with respect to each other. This portable terminal can take either a closed state in which the upper housing 101 and lower housing 102 entirely overlap with each other, and an open state in which the upper housing 101 is slid with respect to the lower housing 102.

As the hinge structure, for example, Japanese Patent Laid-Open No. 2004-187185 discloses a foldable portable device having a hinge unit 203 which connects a first unit 201 and second unit 202 to be relatively openable/closeable about an opening/closing shaft as the center and relatively rotatable about a fixed shaft perpendicular to the opening/closing shaft as the center.

DISCLOSURE OF INVENTION

Problem to be Solved by the Invention

In the case of a slide-structure portable telephone, however, a display portion such as a liquid crystal screen is exposed to the surface even in the closed state. Accordingly, when the user carries the portable telephone, for example, a foreign article may come into contact with the display portion to scratch or damage the display portion. Thus, the slide-structure portable telephone cannot sufficiently satisfy the rated durability.

In the case of a hinge-structure portable telephone, particularly a T-shape hinge-structure portable telephone, the telephone is capable of various movements, e.g., reversing the front and rear surfaces of the display portion such as a liquid crystal screen and furthermore rotating its direction. Hence, the hinge portion must be made strong so it will not be broken. Accordingly, the hinge portion projects to lead to an increase in size of the portable telephone.

The present invention is made to solve the drawbacks described above, and has as its main object to provide a portable terminal in which a size increase can be suppressed as much as possible.

It is another object of the present invention to provide a portable terminal in which a display portion such as a liquid crystal screen can be protected reliably.

Means of Solution to the Problem

According to the present invention, there is provided a portable terminal characterized by comprising a first structure comprising a guide groove extending in each of a pair of opposing side surfaces in a longitudinal direction thereof, and a second structure including a pair of connecting portions which cover part of the opposing side surfaces of the first structure from two outer sides and a projection formed on each of the connecting portions to engage with the guide groove.

EFFECTS OF THE INVENTION

According to the present invention, operation of reversing the front and rear surfaces can be realized without providing a large opening/closing structure such as a T-shape hinge structure. This is because guide grooves and projections which engage with each other are formed on the two side surfaces of each of the first and second structures, respectively, and slide operation and pivoting operation are achieved on the two side surfaces of each of the first and second structures. Hence, a load acting during the opening/closing operation can be dispersed in the two side surfaces. This simplifies the opening/closing structure and suppresses a size increase.

According to the present invention, the durability of the portable telephone which poses a problem in the slide structure can be improved. This is because in the closed state, the second structure covers the display portion such as a liquid crystal screen which is formed on the first structure. This can prevent a foreign article from coming into contact with the display portion and the display portion from scratch or damage when the user carries the portable telephone.

BEST MODE FOR CARRYING OUT THE INVENTION

An embodiment of the present invention will be described with reference to the accompanying drawings. A portable telephone according to this embodiment comprises a first structure including a display portion such as a liquid crystal screen, and a second structure including an operation portion such as keys and a jog shuttle. The two side surfaces of the first and second structures are provided with guide grooves and projections (that is, the relation between the wheels and rails of a train) that engage with each other. This allows the second structure to slide on the display surface side of the first structure. The second structure can pivot at its end to the rear surface side of the first structure. Furthermore, the second structure can slide in the opposite direction at the rear surface side of the second structure. With this two-step slide opening/closing structure, the front and rear surfaces of the portable telephone of this embodiment can be turned smoothly.

Hence, unlike in a T-shape hinge structure, the load of the opening/closing operation and that of the pivoting operation do not act on one portion but can be dispersed. Thus, the opening/closing structure can be simplified, minimizing the size as much as possible. In the closed state, the second structure covers the display portion of the first structure. This prevents any inconveniences in the display portion, thus improving the durability.

The present invention can realize the two-step slide operation that the conventional slide-type portable telephone could not achieve. This makes it possible to distinguish the portable telephone from other portable telephones. Also, the portable telephone of the present invention can be used without narrowing the usable area, unlike the conventional slide-type portable telephone. As the portable telephone can be set in the open state by a series of operations, the operability is also improved.

Although this embodiment exemplifies a portable telephone, the present invention is not limited to a portable telephone, but can be applied to various types of portable terminals such as a PDA (Personal Digital Assistance), a digital camera, an audio player, a laptop personal computer, and the like.

A portable telephone according to an embodiment of the present invention will be described in detail with reference to FIGS. 1A to 7B.

Figure 1A:
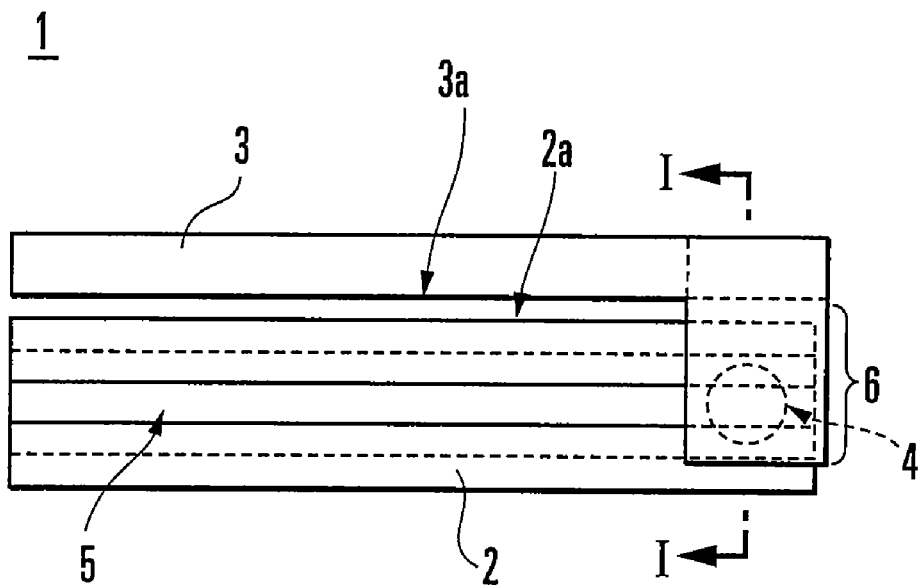
FIG. 1A is a side view showing the structure of a portable telephone according to an embodiment of the present invention.
Figure 1B:
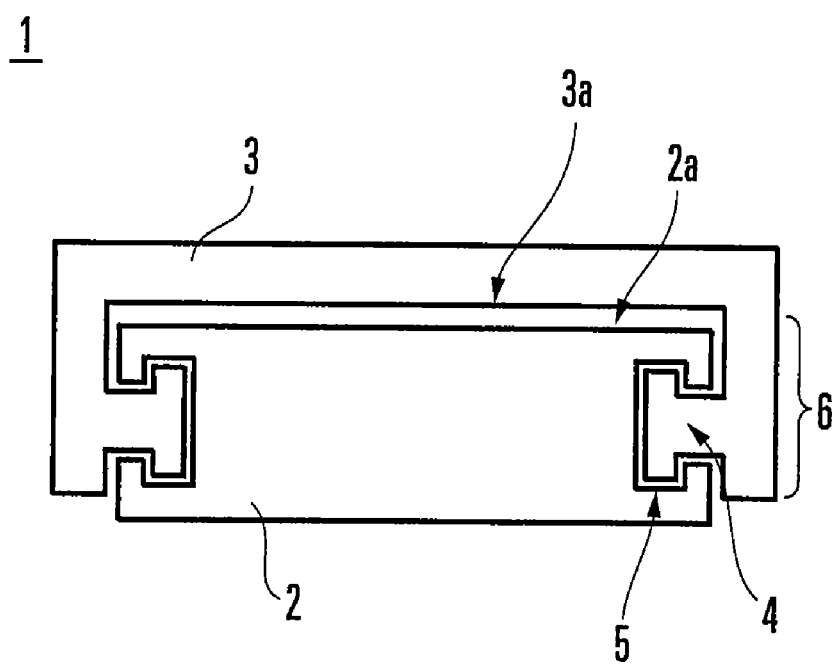
FIG. 1B is a sectional view taken along the direction of the line I-I of FIG. 1A.

As shown in FIGS. 1A and 1B, a portable telephone 1 according to this embodiment comprises a first structure 2 and second structure 3 each having an almost rectangular parallelepiped or almost cubic box shape. The first structure 2 has a display portion 2a, e.g., a liquid crystal display screen or organic EL (ElectroLuminescence) display screen, formed on its one surface, i.e., major surface. The second structure 3 has an operation portion 3a including, e.g., a cross key, numeric keys, a special key, a jog shuttle, a pointing device, a sliding pad, and the like, formed on its one surface, i.e., major surface. In the closed state (to be described later) in which the second structure 3 is kept closed, the display portion 2a and operation portion 3a oppose each other inwardly.

In this embodiment, the first structure 2 comprises the display portion 2a, and the second structure 3 comprises the operation portion 3a. Alternatively, the first structure 2 may comprise an operation portion 3a, and the second structure 3 may comprise a display portion 2a, or each of the first structure 2 and second structure 3 may comprise an operation portion 3a. Regarding the other constituent elements of the portable telephone 1, e.g., a wireless communicating portion, TV broadcast receiver, antenna, loudspeaker, microphone, image sensor, and the like, they may be provided to either structure.

The first structure 2 has, in both of its pair of opposing side surfaces, guide grooves 5 extending in the longitudinal direction of the side surfaces (horizontal direction in FIG. 1A), in other words, in that direction of the side surfaces which is parallel to the major surface. As shown in FIG. 1B, each guide groove 5 has an almost convex sectional shape with its bottom portion being larger than its surface layer portion. The second structure 3 has, at its one end, a pair of connecting portions 6 which cover part of those opposing side surfaces of the first structure 2, including at least the guide grooves 5, from the outside. The connecting portions 6 have, on their surfaces that oppose the guide grooves 5, projections 4 each having an almost convex sectional shape with its distal end being larger than its proximal portion on the connecting portion 6 side. The projections 4 engage in the guide grooves 5. This allows the connecting portions 6 to slide along the guide grooves 5 and to pivot with respect to the guide grooves 5 about a direction that connects the pair of projections 4 as a pivot axis.

Although in FIG. 1B the guide grooves 5, projections 4, and connecting portions 6 are shown in enlargement to facilitate understanding of the structure of the portable telephone 1 of this embodiment, their sizes, shapes, and positions are not limited to those shown in FIG. 1B. In FIG. 1B, each guide groove 5 is formed to extend from one end to the other end of the side surface. Alternatively, the guide groove 5 may terminate before one end, a cap or the like may be inserted in the guide groove 5 at least at one end to seal the guide groove 5, or the width of the guide groove 5 may be narrowed at least at one end. This can prevent the second structure 3 from disengaging from the first structure 2.

The opening/closing operation of the portable telephone 1 will be described in detail with reference to FIGS. 2A to 5B.

Figure 2A:
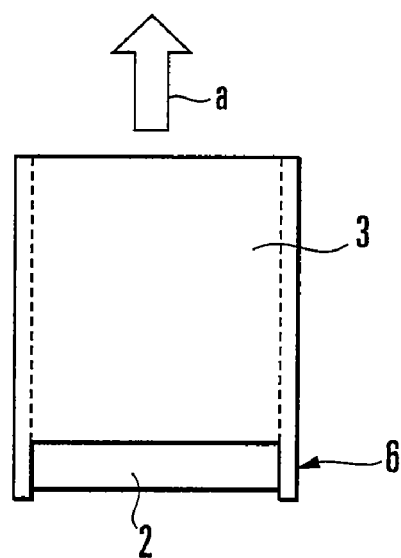
FIG. 2A is a plan view showing a closed state of the portable telephone according to the embodiment of the present invention.
Figure 3A:
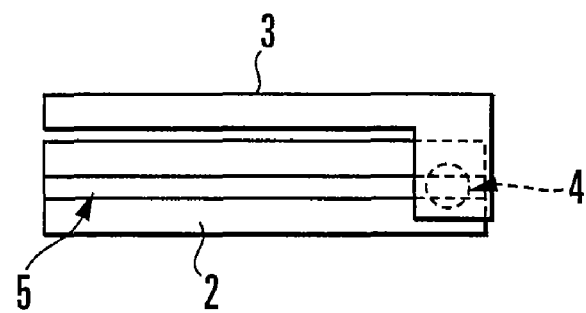
FIG. 3A is a side view showing a state before the start of the first slide operation of the portable telephone according to the embodiment of the present invention.

First, as shown in FIGS. 1A and 3A, in a state in which the operation portion 3a of the first structure 2 and the display portion 2a of the second structure 3 are arranged to oppose inwardly (to be referred to as a "closed state" hereinafter), when seeing the portable telephone 1 from the second structure 3 side, as shown in FIG. 2A, the second structure 3 covers the display portion 2a of the first structure 2. This can prevent inconveniences as in the conventional slide type portable telephone 1 in that the display portion 2a is scratched or damaged while the user carries the portable telephone 1.

Figure 2B:
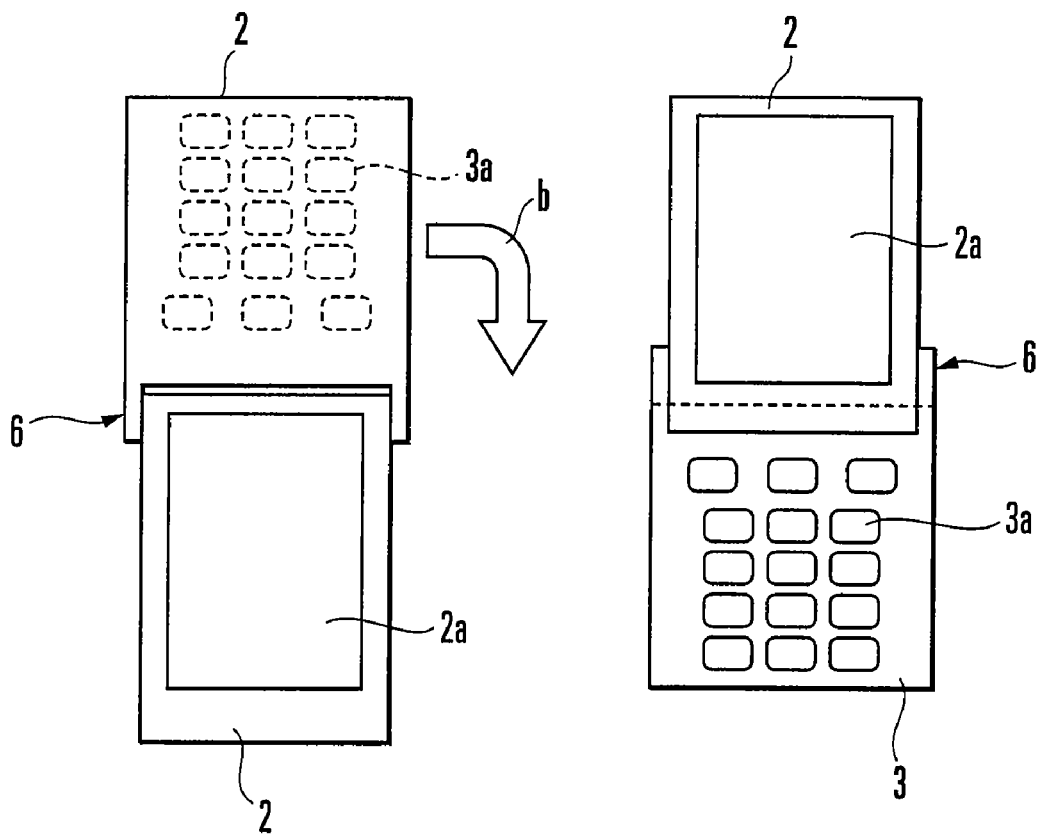
FIG. 2B is a plan view showing a state after first slide operation of the portable telephone according to the embodiment of the present invention.
Figure 2C:
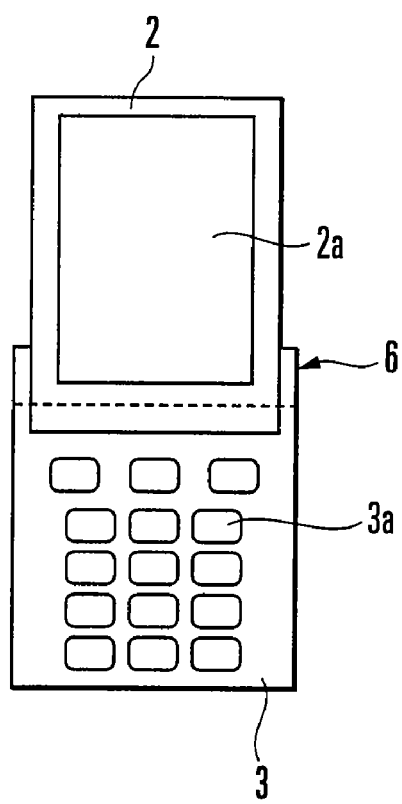
FIG. 2C is a plan view showing a state after second slide operation of the portable telephone according to the embodiment of the present invention.

In FIGS. 2A to 2C, the second structure 3 is larger than the first structure 2. Alternatively, the first structure 2 and second structure 3 may have almost the same sizes, and only the connecting portions 6 may project. In FIGS. 2A to 2C, the end of the second structure 3 on the side of the connecting portion 6 has a notch. Alternatively, if the first structure 2 and second structure 3 do not interfere with each other in the pivoting operation to be described later, the notch may be omitted.

Figure 3B:
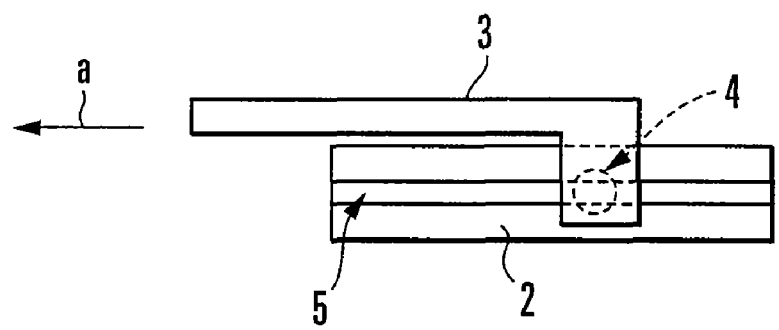
FIG. 3B is a side view showing a state during the first slide operation of the first slide operation of the portable telephone according to the embodiment of the present invention.
Figure 3C:
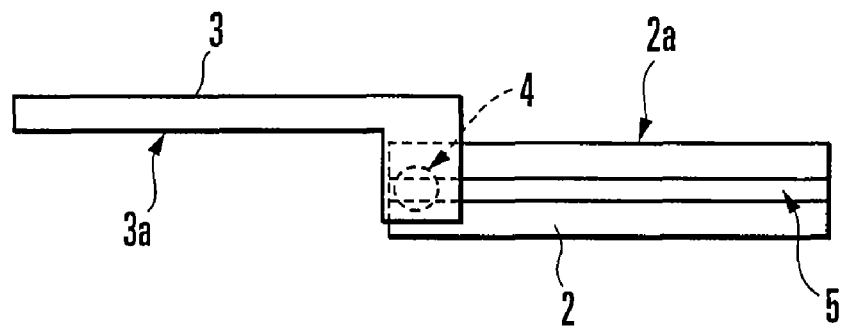
FIG. 3C is a side view showing a state when the first slide operation of the portable telephone according to the embodiment of the present invention is ended.

Then, as shown in FIGS. 3B and 3C, the second structure 3 is moved in the first direction (the leftward direction when seeing the FIGS. 3B and 3C from the front, that is, the direction of an arrow indicated by a symbol a in each of FIGS. 2A and 3B) relative to the first structure 2, in other words, toward the end where the connecting portions 6 are not formed (this series of operations is called "the first slide operation"). More specifically, the projections 4 are slid in the first direction along the guide grooves 5 to move to the ends in the first direction side of the guide grooves 5. When seeing the portable telephone 1 at this time from the second structure 3 side, that is, from the display portion 2a side of the first structure 2, the display portion 2a of the first structure 2 is exposed, as shown in FIG. 2B. In FIGS. 3A to 3C, the guide grooves 5 are formed to extend to the ends of the side surfaces. Alternatively, as described above, the guide grooves 5 may terminate before the ends or be sealed with caps, or the widths of the guide grooves 5 may be narrowed at the ends. This can reliably stop the projections 4 at predetermined positions at the ends.

Figure 4A:
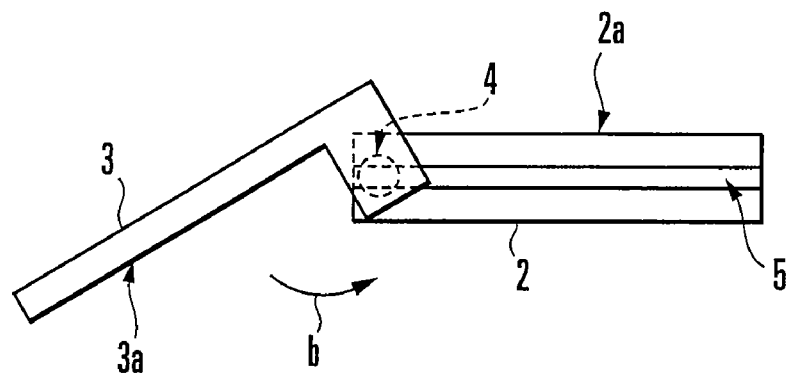
FIG. 4A is a side view showing a state before the start of the pivoting operation of the portable telephone according to the embodiment of the present invention.
Figure 4B:
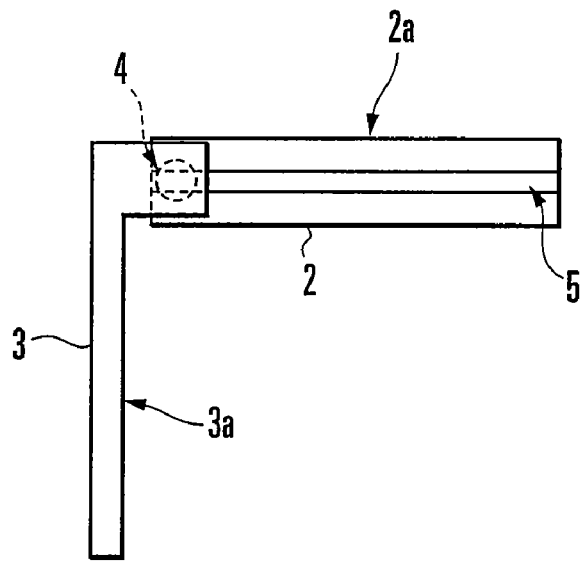
FIG. 4B is a side view showing a state during the pivoting operation of the portable telephone according to the embodiment of the present invention.
Figure 4C:
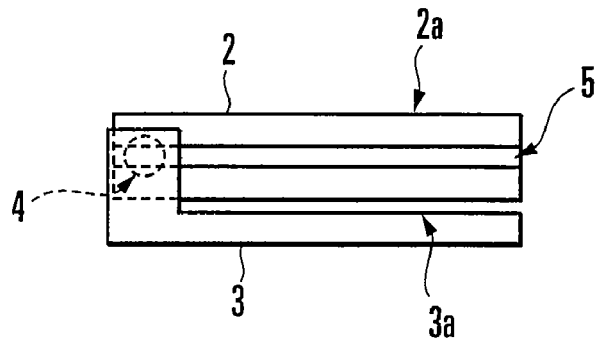
FIG. 4C is a side view showing a state when the pivoting operation of the portable telephone according to the embodiment of the present invention is ended.

Subsequently, the second structure 3 is pivoted relative to the first structure 2 in the direction of an arrow indicated by a symbol b in each of FIGS. 2B and 4A. More specifically, as shown in FIGS. 4A to 4C, the first structure 2 is pivoted about the pair of opposing projections 4 as a pivot axis such that the second structure 3 rotates toward the rear surface (a surface opposite to the surface having the display portion 2a) of the first structure 2 (this series of operations is called a pivoting operation). This exposes the display portion 2a of the first structure 2 to the outside. The operation portion 3a of the second structure 3 opposes the rear surface of the first structure 2.

Figure 5A:
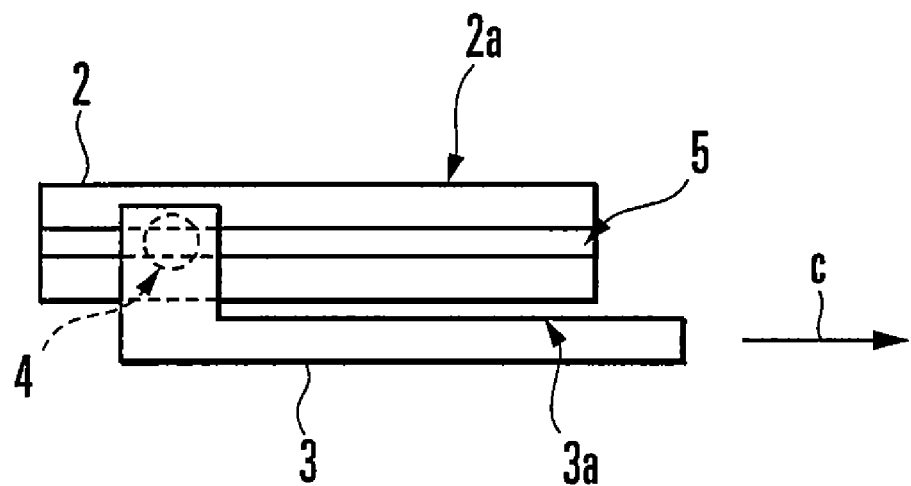
FIG. 5A is a side view showing a state before the start of the second slide operation of the portable telephone according to the embodiment of the present invention.
Figure 5B:
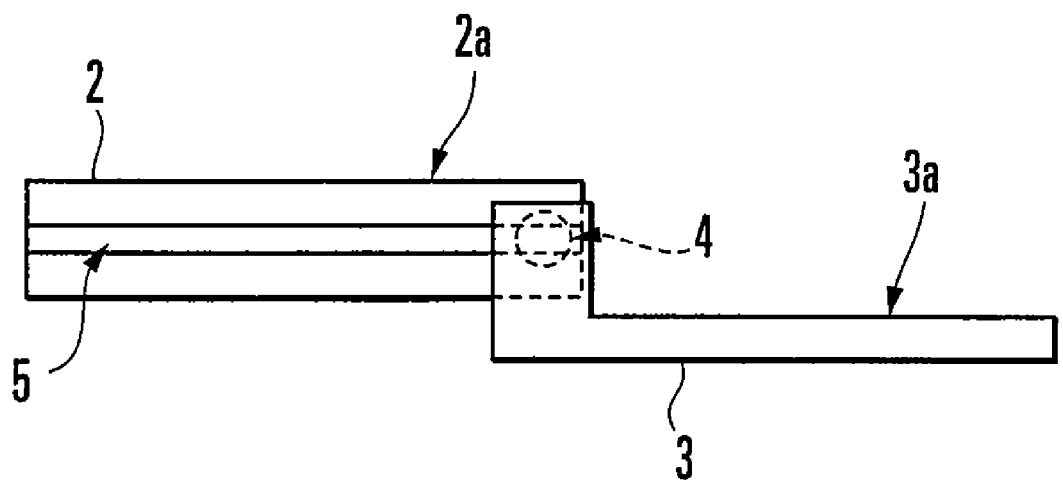
FIG. 5B is a side view showing a state when the pivoting operation of the portable telephone according to the embodiment of the present invention is ended.

Subsequently, as shown in FIGS. 5A and 5B, the second structure 3 is slid in the second direction (a rightward direction when seeing the FIGS. 5A and 5B from the front, that is, the direction of an arrow indicated by a symbol c in FIG. 5A) which is opposite to the first direction (this series of operations is called the second slide operation). More specifically, the projections 4 are slid in the second direction along the guide grooves 5 and moved until the ends in the second direction side of the guide grooves 5. At this time, when seeing the portable telephone 1 from the display portion 2a side of the first structure 2, as shown in FIG. 2C, the display portion 2a of the first structure 2 and the operation portion 3a of the second structure 3 are exposed to the outside as they are directed in the same direction (to be referred to as an "open state" hereinafter). In FIG. 5B as well, the guide grooves 5 are formed to extend to the ends of the side surfaces. Alternatively, as described above, the guide grooves 5 may terminate before the ends or be sealed with caps, or the widths of the guide grooves 5 may be narrowed at the ends. This can reliably stop the projections 4 at the predetermined positions at the ends.

In this manner, according to this embodiment, the first slide operation, pivoting operation, and second slide operation can set the display portion 2a of the first structure 2 and the operation portion 3a of the second structure 3, which are in the closed state to oppose each other inwardly, to the open state in which they are exposed in the same direction. Since the portable telephone 1 can be opened/closed by this novel operation, the portable telephone 1 can be distinguished from other portable telephones.

In the closed state, the first structure 2 covers the display portion 2a of the second structure 3. This can prevent inconveniences such as scratching or damaging of the liquid crystal screen while the user carries the portable telephone 1. The second structure 3 slides or pivots while it sandwiches the first structure 2 from the two sides. This can disperse the load during the opening/closing operation, so the guide grooves 5 and projections 4 need not be very strong. Hence, the size of the opening/closing structure can be smaller than that of the T-shape hinge structure, and a size increase of the portable telephone 1 can be suppressed.

Figure 6:
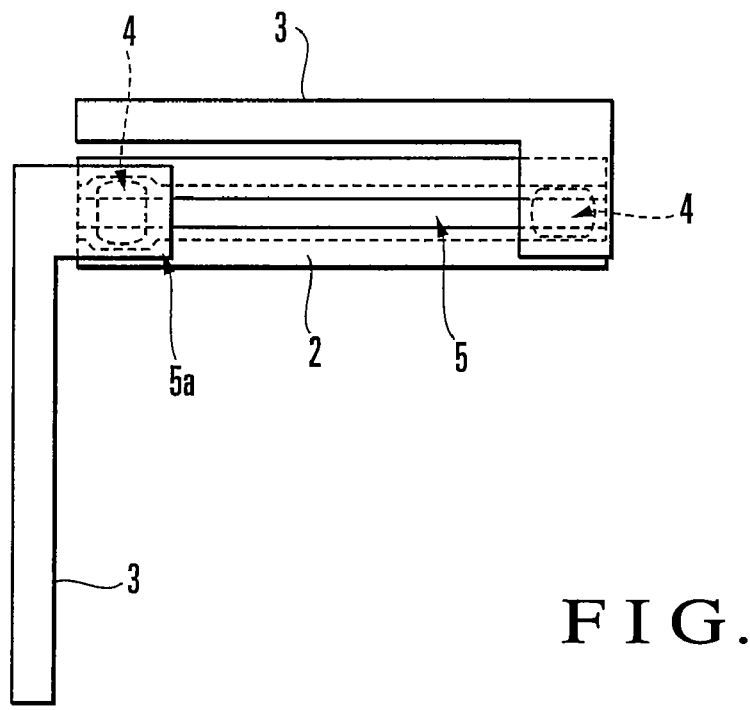
FIG. 6 is a side view showing another structure of the portable telephone according to the embodiment of the present invention.

In this embodiment, the projections 4 formed in the connecting portions 6 of the second structure 3 are circular. However, the projections 4 are not limited to circular shapes, but their shapes can be set freely and appropriately. For example, as shown in FIG. 6, the projections 4 may have almost rectangular shapes which are long in the longitudinal direction of the guide grooves 5 in the closed state (shapes in which the first- or second-direction sizes are large). More specifically, the projections 4 may be horizontally long, and the widths of the guide grooves 5 may be formed to correspond to the short sides of the projections 4. At this time, guide groove expanded portions 5a having widths larger than the long sides of the projections 4 may be formed so the projections 4 can pivot at the terminal end position (the left end in FIG. 6) of the first slide operation. In this case, in the first or second slide operation, the long sides of the projections 4 abut against the corresponding guide grooves 5. Thus, the first structure 2 and second structure 3 can maintain a parallel state. During the pivoting operation, the projections 4 can pivot in the guide groove expanded portions 5a. This can achieve more stable opening/closing manipulation. The guide groove expanded portion 5a shown in FIG. 6 may be provided at each of the two ends of each guide groove 5. Then, the second structure 3 can pivot stably at the two ends of each guide groove 5.

Figure 7A:
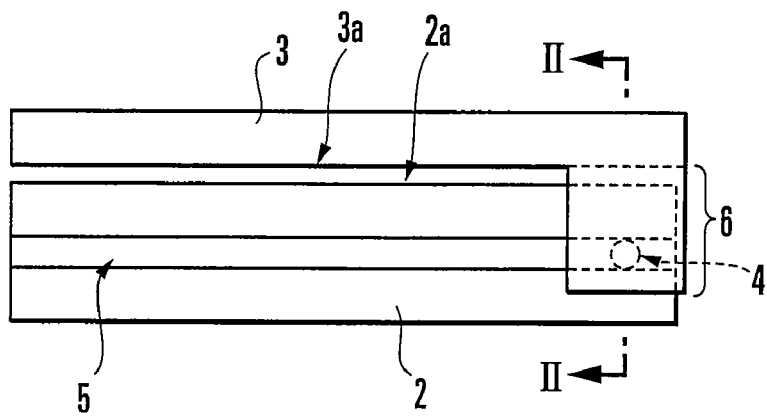
FIG. 7A is a side view showing another structure of the portable telephone according to the embodiment of the present invention.
Figure 7B:
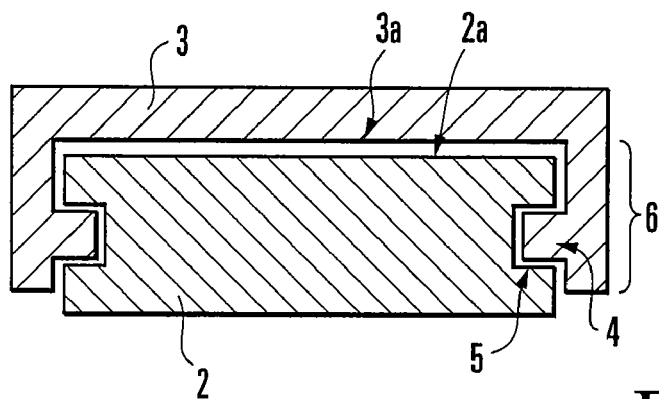
FIG. 7B is a sectional view taken along the direction of the line II-II of FIG. 7A.
Figure 8A:
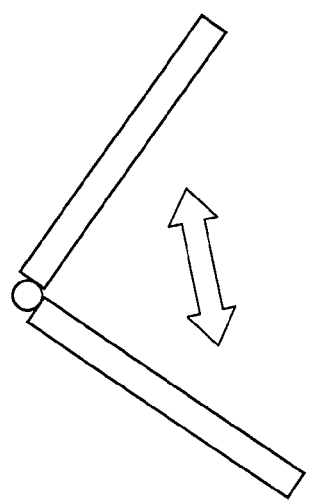
FIG. 8A is a side view showing the arrangement of a conventional folding-structure portable telephone.
Figure 8B:
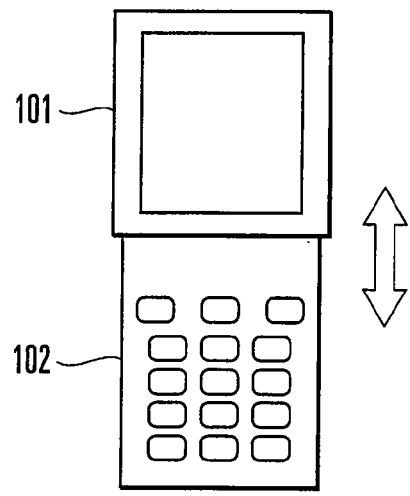
FIG. 8B is a plan view showing the arrangement of a conventional slide-structure portable telephone.
Figure 8C:
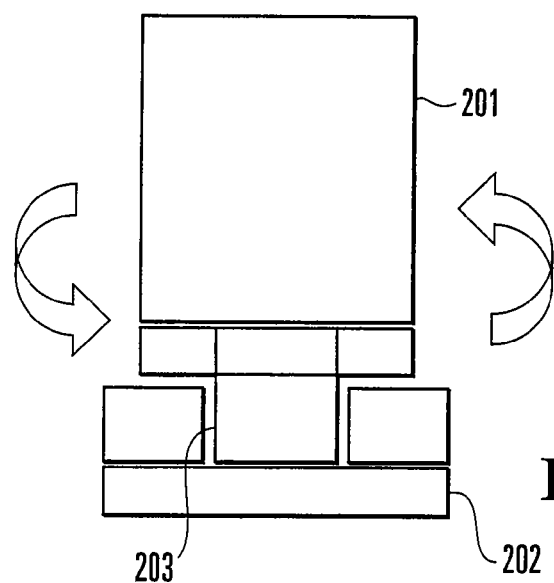
FIG. 8C is a plan view showing the arrangement of a conventional T-shape hinge-structure portable telephone.

In this embodiment, the widths of the guide grooves 5 are large at the bottom portions and small at the surface layer portions. The sizes of the projections 4 are large at the distal ends that oppose the bottom portions of the guide grooves 5, and are small at the proximal portions near the upper layers of the guide grooves 5. The projections 4 are caught by the projections 4, so the first structure 2 and second structure 3 do not disengage from each other easily. The shapes of the projections 4 and guide grooves 5 are not limited to this, but can be freely designed arbitrarily. For example, as shown in FIGS. 7A and 7B, the widths of the guide grooves 5 and the sizes of the projections 4 in the widthwise direction may be set almost equal to each other. Opposite to the case of FIGS. 1A and 1B, the widths of the guide grooves 5 may decrease toward the bottom portions, and the sizes of the projections 4 may increase toward the distal ends. This can also prevent the first structure 2 and second structure 3 from disengaging from each other.

In this embodiment, the second structure 3 is moved from the closed state in the order of the first slide operation, pivoting operation, and second slide operation, to set the portable telephone 1 in the open state. Alternatively, by performing these operations in the opposite manner, the portable telephone 1 can be set from the open state to the closed state. More specifically, in the open state, when the portable telephone 1 performs the second slide operation, pivoting operation, and first slide operation in this order in the opposite direction, it is set from the open state to the closed state. When the portable telephone 1 is at the position of the open state as shown in FIG. 5B, the second structure 3 may be pivoted to the operation portion 3*a* side about the projections 4 as the pivot center, to set the portable telephone 1 in the closed state. When the portable telephone 1 is set at the position of the closed state as shown in FIG. 1A, the second structure 3 may be pivoted to the surface opposite to the surface provided with the operation portion 3*a*, to set the portable telephone 1 in the open state.

In the state shown in FIG. 4C, the portable telephone 1 may perform various types of operations such as automatic answering operation, a calling function, a mailer function, a browser function, a display function such as TV broadcast, and the like. In this case, if the display portion 2*a* forms a touch panel, or manipulation keys are formed on that surface of the first structure 2 which is provided with the display portion 2*a*, the various types of operations described above can be achieved on the basis of input operation from the touch panel, manipulation keys, and the like.

INDUSTRIAL APPLICABILITY

The structure of the present invention is not limited to a portable telephone but can be applied to any arbitrary device which is used by opening/closing a first structure 2 and a second structure 3, and can be similarly applied to, e.g., various types of portable terminals such as a PDA, digital camera, and audio player.

The invention claimed is:

1. A portable terminal comprising:
   a first structure comprising a guide groove extending in each of a pair of opposing side surfaces in a longitudinal direction thereof; and
   a second structure including a pair of connecting portions which cover part of said opposing side surfaces of said first structure from two outer sides and a projection formed on each of said connecting portions to engage with said guide groove,
   characterized in that by first slide operation of moving said second structure in a first direction, pivoting operation of pivoting said second structure at an end in the first direction toward a major surface of said second structure so a rear surface side of said first structure opposes a major surface side of said second structure, and second slide operation of moving said second structure in a second direction opposite to the first direction, said second structure is set from a closed state in which a major surface of said first structure opposes a major surface of said second structure, to an open state in which said major surface of said first structure and said major surface of said second structure are exposed to the outside.

2. A portable terminal according to claim 1, characterized in that said connecting portions are formed on one end of said second structure in the longitudinal direction.

3. A portable terminal according to claim 1, characterized in that said guide groove is formed such that a width of a bottom portion thereof is larger than that of a surface layer portion thereof, and said projection is formed such that a distal end thereof which opposes said bottom portion is larger than a proximal portion thereof which is in the vicinity of said surface layer portion.

4. A portable terminal according to claim 1, characterized in that said second structure pivots relative to said first structure about said projection as a pivot center.

5. A portable terminal according to claim 1, characterized in that said second structure moves relative to said first structure along said guide groove.

6. A portable terminal according to claim 1, characterized in that said first slide operation moves said second structure in said first direction along said guide groove, said pivoting operation pivots said second structure at said end in the first direction toward said major surface of said second structure about said projection as a pivot center so said rear surface side of said first structure opposes a major surface side of said second structure, and said second slide operation moves said second structure in said second direction opposite to the first direction along said guide groove.

7. A portable terminal according to claim 1, characterized in that said projection is formed such that, in a state in which a major surface of said first structure opposes a major surface of said second structure, a size thereof in the longitudinal direction is larger than a size thereof in a direction perpendicular to the longitudinal direction, and said guide groove is formed such that at least a width of one end thereof in the longitudinal direction is formed larger than a size of said projection in the longitudinal direction.

8. A portable terminal according to claim 7, characterized in that said guide groove is formed such that a width thereof excluding an end in the longitudinal direction is substantially equal to a size of said projection in a longitudinal perpendicular to the longitudinal direction.

9. A portable terminal according to claim 1, characterized in that said first structure has a display portion formed on a major surface thereof, and said second structure has an operation portion formed on a major surface thereof.

10. A portable terminal according to claim 1, characterized in that said portable terminal comprises a portable telephone.

\* \* \* \* \*